United States Patent
Prendergast et al.

(10) Patent No.: US 11,062,347 B2
(45) Date of Patent: Jul. 13, 2021

(54) SYSTEMS AND METHODS FOR PROVIDING AUTHENTICITY, INTEGRITY, AND NON-REPUDIATION TO COMMUNICATIONS ONLINE

(71) Applicant: MadHive, Inc., New York, NY (US)

(72) Inventors: Nelson Hunter Prendergast, Grandville, OH (US); Aaron Brown, New York, NY (US)

(*) Notice: Subject to any disclaimer, the term of this patent is extended or adjusted under 35 U.S.C. 154(b) by 0 days.

(21) Appl. No.: 17/175,024

(22) Filed: Feb. 12, 2021

(65) Prior Publication Data

US 2021/0174388 A1  Jun. 10, 2021

Related U.S. Application Data

(63) Continuation of application No. 17/145,590, filed on Jan. 11, 2021, which is a continuation of application (Continued)

(51) Int. Cl.
*G06Q 30/00* (2012.01)
*G06Q 30/02* (2012.01)
(Continued)

(52) U.S. Cl.
CPC ..... *G06Q 30/0242* (2013.01); *G06Q 30/0276* (2013.01); *G06Q 30/0277* (2013.01);
(Continued)

(58) Field of Classification Search
CPC .......... G06Q 30/0242; G06Q 30/0276; G06Q 30/0277; H04L 9/006; H04L 9/0643
See application file for complete search history.

(56) References Cited

U.S. PATENT DOCUMENTS

2015/0186931 A1  7/2015  Flake
2016/0217532 A1  7/2016  Slavin
(Continued)

OTHER PUBLICATIONS

International Search Report and Written Opinion, PCT/US/20/37748, dated Sep. 8, 2020.

*Primary Examiner* — Scott C Anderson
(74) *Attorney, Agent, or Firm* — The Plus IP Firm; Derek Fahey

(57) ABSTRACT

A system for providing non-repudiation and data integrity of communications online is shown and described. The system has one or more servers communicably connected to a communications network, the one or more server including at least one processor configured for receiving, from a first party, an ad request for an ad impression available for sale. The ad request includes a plurality of attributes associated with the ad impression and a first cryptographic proof that provides non-repudiation and data integrity of the ad request, wherein the first cryptographic proof comprises a second cryptographic proof of the first party; and, authenticating non-repudiation and data integrity of the ad request by querying a blockchain having a public key infrastructure. The public key infrastructure also has a public key associated with the first party. Furthermore, the public key infrastructure authenticates the second cryptographic proof against the public key associated with the first party.

9 Claims, 11 Drawing Sheets

Related U.S. Application Data

No. 16/901,694, filed on Jun. 15, 2020, now Pat. No. 10,896,436.

(60) Provisional application No. 62/861,452, filed on Jun. 14, 2019.

(51) Int. Cl.
*H04L 9/00* (2006.01)
*H04L 9/06* (2006.01)

(52) U.S. Cl.
CPC ............ *H04L 9/006* (2013.01); *H04L 9/0643* (2013.01); *G06Q 2220/00* (2013.01); *H04L 2209/38* (2013.01)

(56) References Cited

U.S. PATENT DOCUMENTS

| | | | |
|---|---|---|---|
| 2016/0379157 A1* | 12/2016 | Nassar | G06Q 10/0833 705/337 |
| 2017/0032413 A1 | 2/2017 | McCartney | |
| 2017/0111175 A1 | 4/2017 | Oberhauser et al. | |
| 2017/0308681 A1 | 10/2017 | Gould | |
| 2017/0346639 A1 | 11/2017 | Muftic | |
| 2018/0005186 A1 | 1/2018 | Hunn | |
| 2018/0247191 A1* | 8/2018 | Katz | G06N 3/08 |
| 2019/0207768 A1 | 7/2019 | Hardy | |
| 2019/0333096 A1 | 10/2019 | Johnson | |
| 2019/0378162 A1* | 12/2019 | Goldberg | G06Q 30/0242 |
| 2019/0386969 A1 | 12/2019 | Verzun | |
| 2020/0126114 A1 | 4/2020 | Kuo | |

* cited by examiner

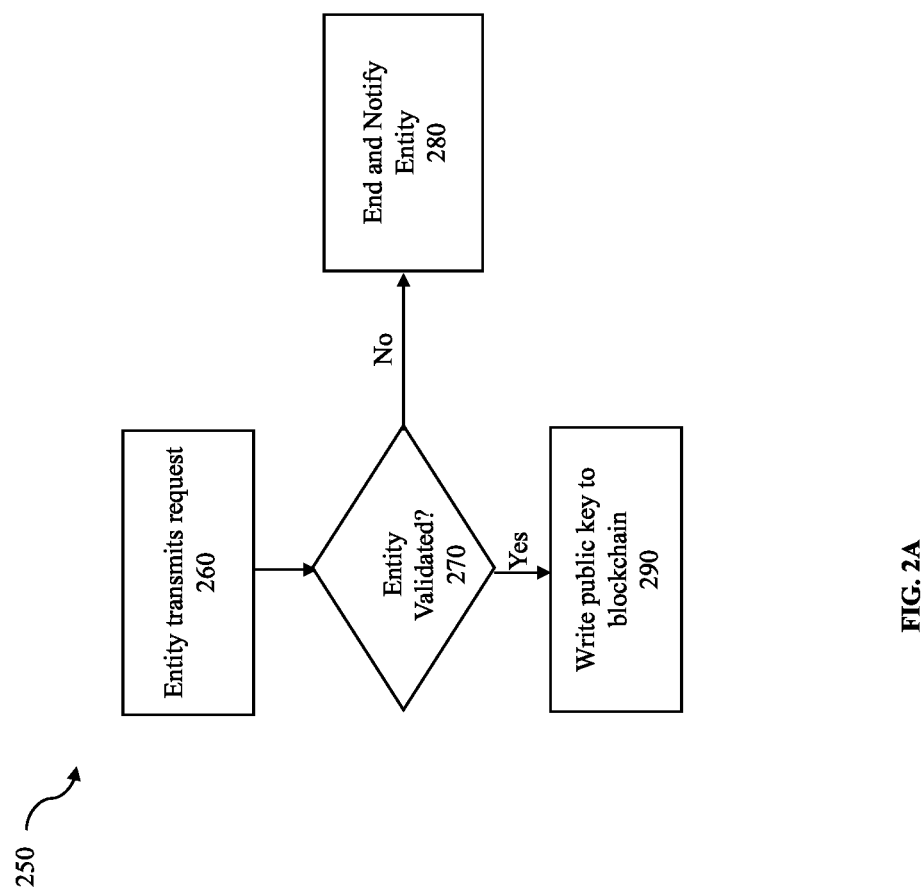

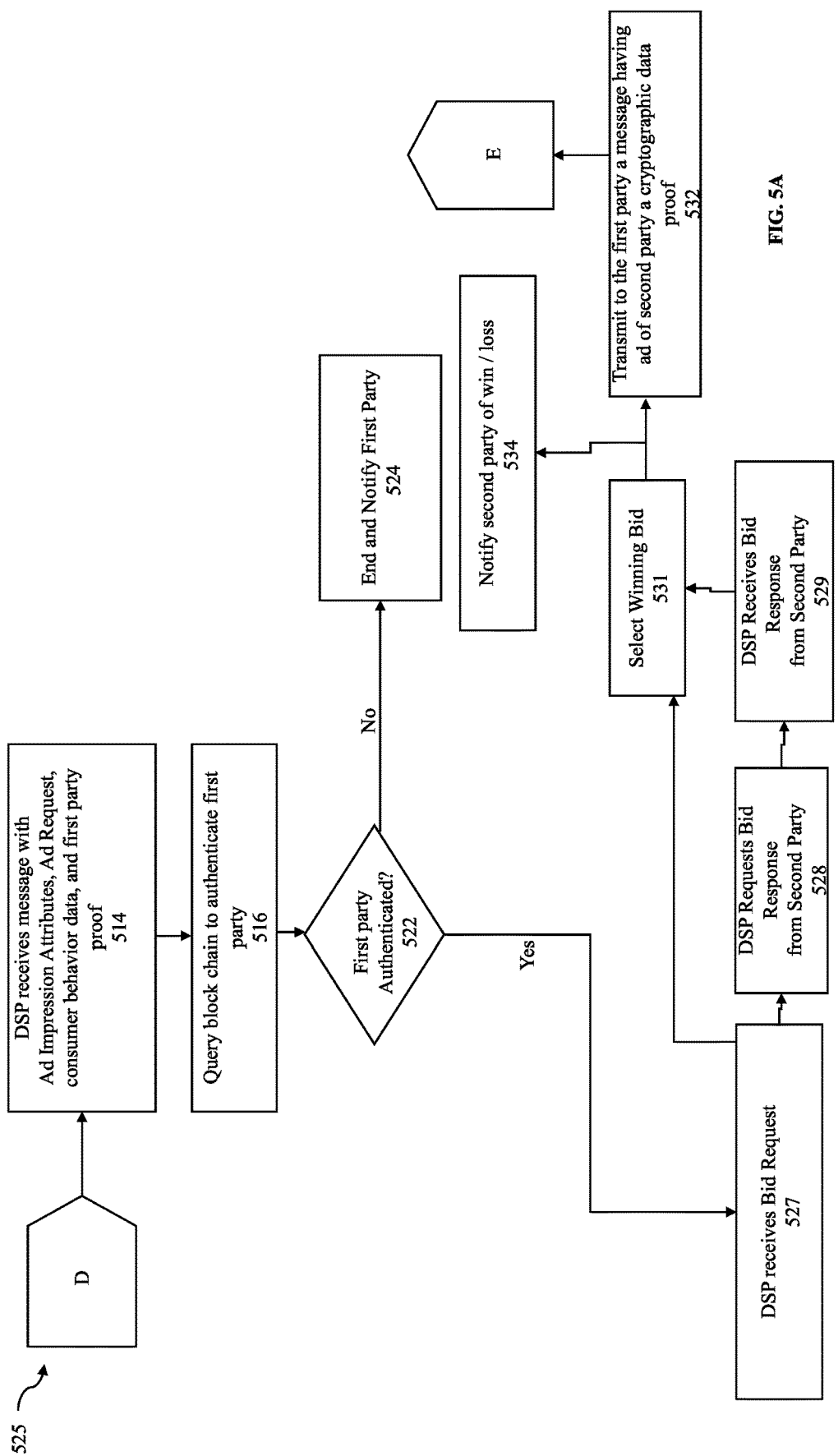

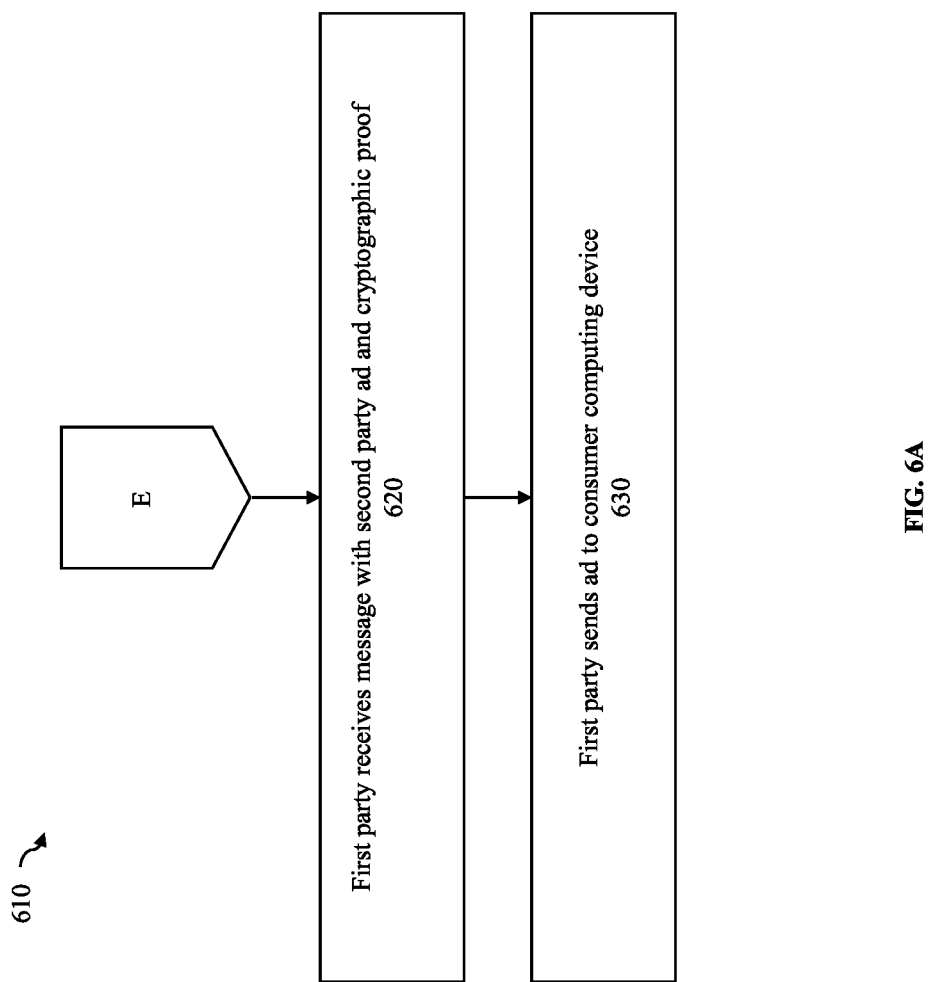

SYSTEMS AND METHODS FOR PROVIDING AUTHENTICITY, INTEGRITY, AND NON-REPUDIATION TO COMMUNICATIONS ONLINE

CROSS-REFERENCE TO RELATED APPLICATIONS

This application is a continuation of U.S. application Ser. No. 17/145,590, filed on Jan. 11, 2021, which is a continuation of U.S. application Ser. No. 16/901,694 (now patented as U.S. Pat. No. 10,896,436), filed on Jun. 15, 2020, which claims priority pursuant to 35 U.S.C. § 119(e) to U.S. Provisional Application No. 62/861,452, filed Jun. 14, 2019. The 62/861,452 application is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The disclosed embodiments generally relate to advertising technology, and, more particularly, to techniques for providing authenticity, integrity, and non-repudiation in advertising technology.

BACKGROUND

Online advertising has become one of the most popular forms of marketing and promotion in which internet-based devices serve as a medium for delivering digital promotional marketing messages to consumers. Internet activity of consumers is collected and utilized in order to generate targeted advertising based on factors such as the behaviors, interests, and other contexts of the particular consumer resulting in the consumer receiving ads that ideally align with the consumer's demographic, beliefs, interests, etc. Common entities within the online advertising space include the publisher who hosts or showcases advertisements configured to be presented to the consumer, and the marketer who attempts to maximize exposure of their advertising campaigns.

A supply-side platform (SSP), or sell-side platform, and a demand-side platform (DSP) work together to enable publishers to sell advertisement impression opportunities, also known as impressions, and to enable advertisers to purchase the advertisement impression opportunities. An SSP is a technology platform to enable web publishers and digital out-of-home (DOOH) media owners to manage their advertising inventory, fill it with ads, and receive revenue. A DSP is a technology platform to enable advertisers and marketers to distribute their ads to publishers. In at least some cases, DSPs and SSPs are configured to utilize a real-time bidding (RTB) process to connect advertisers (i.e., the buyers) and publishers (i.e., the sellers) and facilitate transactions for individual advertisement impression opportunities. Real-time bidding allows individual advertisement impression opportunities to be programmatically auctioned in real time, thereby enabling publishers to obtain maximum value and advertisers to obtain the most advantageous advertisement impressions for their campaigns. Additionally, real-time bidding greatly improves efficiency because advertisers do not need to negotiate with individual publishers to purchase advertisement impression opportunities. It will be appreciated by those of ordinary skill in the art that ad tags and/or ad pixels are generally short snippets of code (e.g., javascript) that, in the context of advertising, collect information about the consumer and/or the behavior of the consumer on the website, application, or other context surrounding the advertisement impression opportunity. The tags and/or pixels may also collect and/or report information about the advertisement impression opportunity, such as format information (e.g., audio advertisement, video advertisement, banner advertisement, etc.).

Marketers engage in an auction with publishers wherein marketers bid based on bid requests, traffic rules, budgets, and various other factors in order for their advertising content to be selected by the publishers and allocated on portions of their web pages or applicable platforms commonly referred to as impression opportunities. However, this process has become susceptible to various forms of fraud and abuse from third parties due to the lack of effective mechanisms for verifying the authenticity and data integrity of marketing messages exchanged between the publishers and the marketers.

As a result, marketers and/or advertisers utilize an abundant amount of time, energy, and resources in order to reach consumers, while publishers suffer various damages due to the lack of authenticity and data integrity of content published within the impression opportunities, such as counterfeit callouts.

Therefore, there exists a need for improvements over the prior art and more particularly for a more efficient way to track and provide verifiable assurances relating to information associated with messages in order to ensure authenticity and data integrity of marketing messages exchanged between publishers and marketers.

SUMMARY

This Summary is provided to introduce a selection of disclosed concepts in a simplified form that are further described below in the Detailed Description, including the drawings provided. This Summary is not intended to identify key features or essential features of the claimed subject matter. Nor is this Summary intended to be used to limit the claimed subject matter's scope.

A system for providing authenticity, integrity, and non-repudiation to advertising technology is disclosed. The system comprising one or more servers communicably connected to a communications network, the one or more servers including at least one processor configured for: receiving, from a first party, an ad request for an ad impression available for sale, wherein the ad request includes a plurality of attributes associated with the ad impression and a cryptographic proof that provides non-repudiation and data integrity of the ad request; authenticating the non-repudiation and data integrity of the ad request by querying a blockchain; accessing a database of second parties seeking to purchase ads online, wherein the database stores attributes associated with each second party; matching the ad request with a selected second party in the database based on the attributes associated with each second party in the database and the attributes associated with the ad impression of the ad request; and, transmitting, to the first party, a message comprising an ad for the selected second party and a cryptographic proof that provides non-repudiation and data integrity of the message, so as to fill the ad impression with the ad for the selected second party.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims. The foregoing and other features and advantages of the present invention will be apparent from the following more particular description of the preferred embodiments of the invention, as illustrated in the accompanying drawings.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein:

FIG. 2A is a flowchart illustrating an example validation process within the system for providing authenticity, integrity, and non-repudiation to advertising technology, according to an example embodiment;

FIG. 5A is a flowchart illustrating the second example data transmission within the system for providing authenticity, integrity, and non-repudiation to advertising technology, according to an example embodiment;

FIG. 6A is a flowchart illustrating the third example data transmission within the system for providing authenticity, integrity, and non-repudiation to advertising technology, according to an example embodiment;

DETAILED DESCRIPTION

Figure 1:
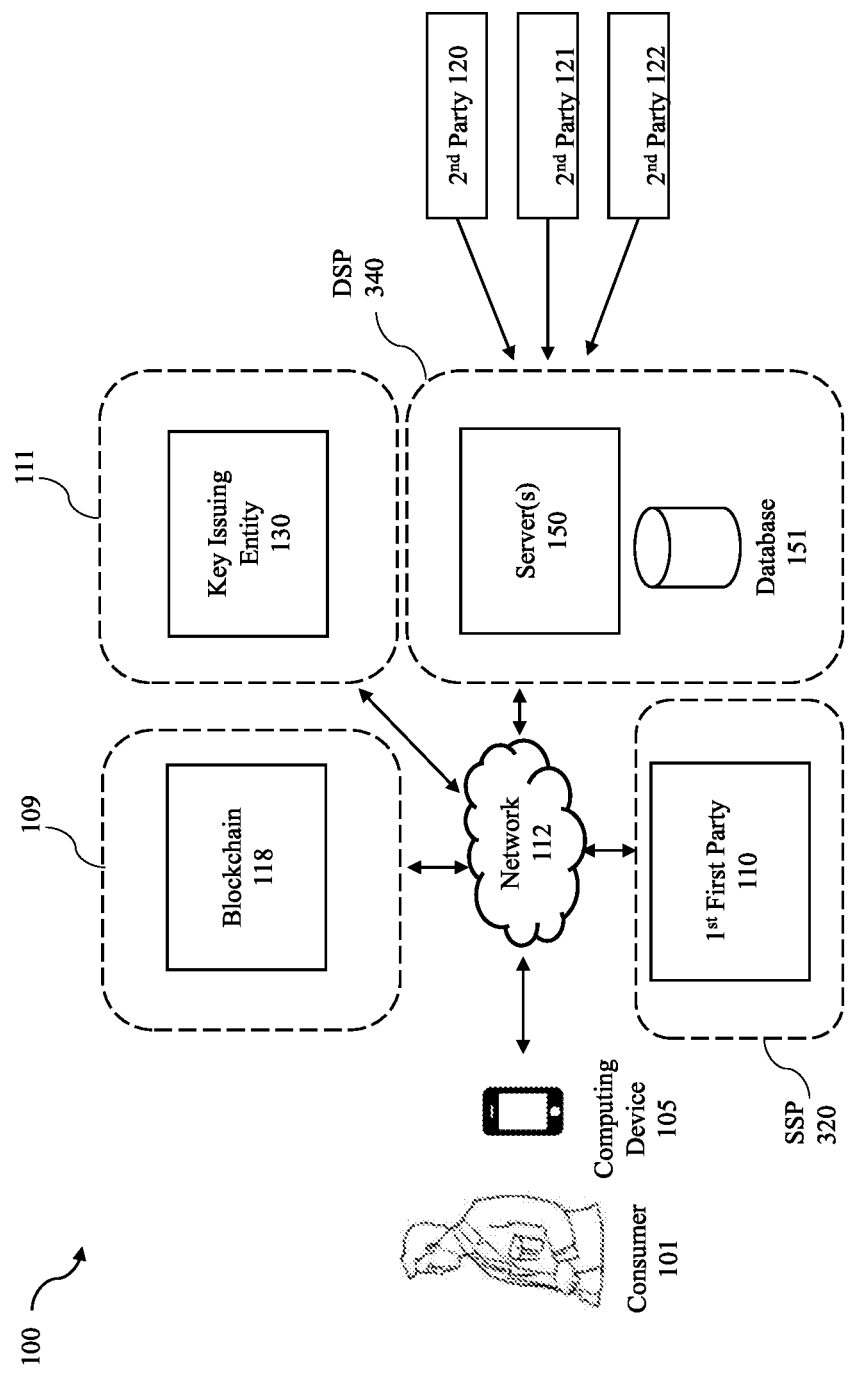
FIG. 1 is an example system for providing authenticity, integrity, and non-repudiation to advertising technology in which the techniques described may be practiced according to certain embodiments.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments provide systems and methods for providing authenticity, integrity, and non-repudiation to advertising technology. In addition, the systems and methods contribute authentication and security mechanisms to advertising technology by integrating blockchain security technology in order to implement a ledger that supports identifying, tracking, and encrypting various information necessary for ensuring that the proper ad is selected and presented within an ad impression. Furthermore, the systems and methods provide recording to the blockchain accumulated cryptographic messages and components of said messages integrating "signing" by applicable entities at various intervals in order to assist with authentication. Thus, the systems and methods herein improve the functioning of computing systems, in particular advertising technologies, by not only ensuring security and authenticity of data, but also by accomplishing this in a manner that reduces storage of datasets within the blockchain resulting in the reduction of the amount of resources utilized by publishers and marketers for effective online advertising. The claimed subject matter further improves over the prior art by providing a system that allow DSPs to quickly and easily authenticate messages and data sent by an advertiser or marketer. The claimed subject matter also improves over the prior art by providing a system that allow publishers to quickly and easily authenticate a bid submitted by a DSP or an advertiser.

Referring now to FIG. 1, a system for providing authenticity, integrity, and non-repudiation to advertising technology 100 is depicted. System 100 comprises a user or consumer 101 operating on a computing device 105, a first platform 109 comprising a blockchain and/or distributed ledger 118, a second platform 111 comprising a key issuing entity 130, a publisher 110 (hereinafter referred to as the first party) configured to display a plurality of ads within a plurality of portions of ad space and send requests for ads while operating on a supply side platform 320, a demand side platform 340 (DSP) comprising a server or a plurality of servers 150 and a database 151, and a plurality of marketers/advertisers 120-122 (hereinafter referred to as the second party) configured to interact (receive ad content and other applicable data) with DSP 340, wherein computing device 105, first platform 109, second platform 111, SSP 320, and DSP 340 are configured to communicate over a network 112, such as the internet. It is to be understood that the aforementioned platforms of system 100 may be designed and configured to include fewer, more or different components, and the division of work between the components may vary depending on the arrangement. It should be understood that the system may include additional computing devices which are associated with intermediating platforms other platforms or entities or various combinations thereof. For example, in one embodiment, DSP 340 may be designed and configured to function as both a DSP and a SSP, wherein the SSP is configured to assist first party 110 in managing advertising impression inventory and maximizing revenue from digital media and the DSP is configured to assist in automation of ad purchases from first party 110 by connecting second parties 120-122 to consumer 101 via real-time bidding (RTB). It should also be understood that one or more publishers may be providing information to each SSP platform. In one embodiment, DSP 340 is a centralized entity configured to integrate or associate first platform 109 and second platform 111 in order to provide non-repudiation and data integrity of communications in ad transactions in addition to managing the auctioning for RTB along with additions, deletions, and updates to blockchain 118 based on verification keys generated by key issuing entity 130. By way of another example, it is understood that more or numerous SSP, SSPs, second parties, blockchain 118, computing devices 105, consumers 101, first platform 109, second platform 111 etc., may be used and is within the spirit and scope of the claimed embodiments. In other embodiments, the consumer device 105 may transmit data directly to the SSP, which in turn transmits data to the DSP. It is understood that these are not limiting embodiments and other embodiments may be within the spirit and scope of the present invention.

Computing device 105 may be a computing device including but not limited to a mobile phone, tablet, smart phone, smart tv, application, over-the top media service (OTT), streaming platform, desktop, laptop, wearable technology, or any other device or system comprising a processor and configured to host and display advertisements. Advertisements as described herein, include but are not limited to picture/visual, audio, video, and/or combination of the aforementioned content thereof that may be retrieved by computing device 105 and/or first party 110 for publishing purposes.

The publisher devices or first party devices 110, which generally take the form of servers, provide compelling media content that attracts consumers, thereby providing an opportunity to sell an advertisement impression. Similarly, advertiser devices 120, 121 and 122, which also generally take the form of servers, provide advertisements in the form of audio and/or visual media content that can be retrieved by consumer devices 105 and/or publisher devices 110 and viewed in conjunction with and/or prior to the media content provided by publishers. In many cases, the advertiser can specify specific advertisement targeting criteria which define the target audience for a particular advertisement, as well as various other rules that outline how, when, and/or to whom the advertisement may be served by a publisher in order to receive credit and/or payment for an advertisement impression. The information and data provided by the advertiser may be stored in database(s) 151 or may be provided to the DSP upon request.

FIG. 1 further shows that server 150 includes a database or repository 151, which may be a relational database comprising a Structured Query Language (SQL) database stored in a SQL server or a database that adheres to the NoSQL paradigm. Other devices associated with the system may also include databases. The database 151 may serve data, as well as related information, used by server 150 and devices of the system during the course of operation of the invention. It is understood that the database of second parties may be associated with the DSP and server, a database associated with a plurality of second parties or any combination thereof. Additionally, it shall be understood that first party 110, SSP 320 second parties 120-122, and other entities within system may also include databases in communication with their associated servers.

In one embodiment, first platform 109 functions as a distributed ledger and/or blockchain supporting database wherein entries in the database are entered in blocks chained together using digital cryptographic signatures. The blockchain include a public key infrastructure including public keys of parties that have been verified by key issuing entity 130 of platform 111 against which a plurality of cryptographic proofs of said parties may be authenticated.

It will be appreciated by those of ordinary skill in the art that a blockchain is a distributed ledger, meaning that the ledger is spread across a plurality of devices in a kind of peer-to-peer network. The blockchain ledger is cryptographically secured and data can only be added to the blockchain. Critically, any additions and/or transactions (i.e., newly created blocks) made to the blockchain are validated by other devices in the network against one or more criteria defined by the blockchain protocol. The additions and/or transactions to the blockchain are only made final and added to the blockchain ledger after a consensus has been reached among the validating devices on the network. In one exemplary embodiment, the record store discussed herein is built as a smart contract in a Permissioned Ethereum-based blockchain, such that the record store has the ability to rapidly iterate designs utilizing the semi-Turing Complete programming language Solidity. However, this specific blockchain design is but one of many possible suitable implementations. The blockchain-based record store system described herein is utilized for registering cryptographic identities for the various parties of the network involved in advertisement transactions, including the publishers, the advertisers, the supply-side platforms, and the demand-side platforms. In order to register a cryptographic identity in this system, this system, the owner of may write, at a designated record name, the public key of an asymmetric keypair. In one embodiment, these cryptographic identities are generated using the Libsodium library, against the Ed25519 elliptic curve. In effect, this allows the records store to act as a Public Key Infrastructure (PKI). In order for a PKI to be trusted, there must be a root of trust in the system. The root of trust may be some trusted entity and/or certifying entity, or key issuing entity 130 associated with second platform 111. The key issuing entity may be a certifying entity, such as Adleger, a non-profit consortium or entity implementing global technical standards and solutions for the digital media and blockchain industries. However, other types of entities may be used and are within the spirit and scope of the claimed embodiments.

Second platform 111 may be a component of first platform 109 or configured to be associated and/or integrated with first platform 109, wherein key issuing entity 130 may utilize a public key infrastructure (PKI) or other applicable infrastructure configured to assist an entity to identify, manage, and authenticate members (first party 110 and second parties 120-122).

Due to interconnectivity of the devices within systems of the prior art, there is a high probability of security breach. The components of system 100, in particular the combination of blockchain 118 and key issuing entity 130 provided by server 150 via a centralized platform configured to be integrated or associated with both DSP 340 and SSP 320, circumvent these issues by providing authentication of parties and transmissions of data associated with said parties within system 100 subject to factors such as, but not limited to, security mechanisms, campaign goals, budgets, performance metrics, and any other applicable factors associated with consumer 101, first party 110, and/or second parties 120-122. Generated messages initially transmitted from computing device 105 may be designated for ad space based on at least consumer behavior such as but not limited to user activity, browsing history, purchasing history, inputs received from one or more sensors associated with computing device 105 (visual and/or audio), mouse/keyboard activity, session time, or any other applicable form of useful consumer behavior configured to assist selection and presentation of ad messages within ad spaces. This will be discussed in greater detail with reference to FIG. 4.

For the purpose of explanation of operations associated with system 100, FIGS. 2-6A will be referred to collectively in order to properly describe data transmissions occurring within system 100. It is to be understood that data transmissions within system 100 may occur simultaneously, incrementally, or in any other sequence that allows system 100 to accomplish the aims and goals described throughout the disclosure.

Figure 2:
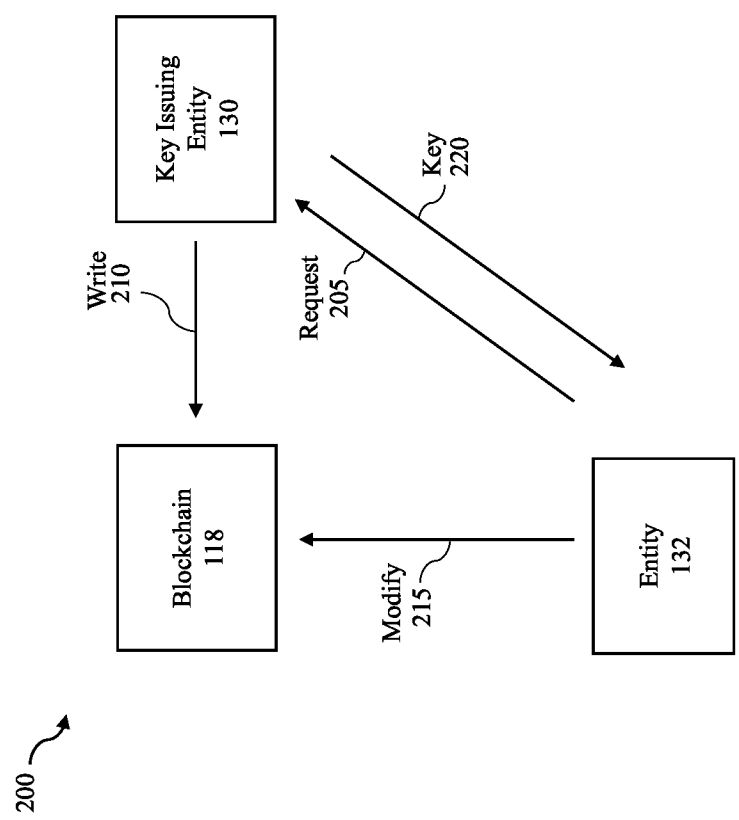
FIG. 2 is a block diagram illustrating an example verification transaction within the system for providing authenticity, integrity, and non-repudiation to advertising technology, according to an example embodiment.

FIG. 2 illustrates the basic functions and FIG. 2A illustrates the process steps of the operation of the block chain. First, when an advertising industry entity 132 (e.g., a particular publisher, supply-side platform, demand-side side platforms, or advertiser) sends a request 205 to be included in the record store system, the trusted entity or key issuing entity 130 entity validates that the applying entity is who they claim to be. Once validated, a private key 220 is created by the entity 130 and provided to entity 132. The public key associated with this private key is written 210 to the blockchain by the key issuing entity 130. The public key is the basis for the advertising industry entity's new blockchain-based account. Further, entity 130 creates a record, record store or space in the blockchain 118, unique to the party 132, wherein said record, record store or space may be edited only by the entity 132 using his private key 220.

In one embodiment, the dedicated record store smart contract for the respective advertising industry entity may be resolved by the hash (e.g., Sha-256) of the name of the entity (e.g., "New York Gazette"), through a registry contract that is controlled by the trusted entity and/or certifying entity against the registry smart contract, will return the address of the dedicated record store contract that is controlled by the respective the advertising industry entity, to the requesting party. Once this address is obtained, queries for records that are pertinent to the respective the advertising industry entity may be obtained through requesting the record of concern by name from the record store contract located at the resolved contract address. In order to resolve a specific record in the record store, the name of the record may be hashed (e.g., Sha-256) and passed to a lookup function. This lookup function will resolve the sub-record for the advertising industry entity of concern. In one embodiment, this construction of the registry contract with a per-entity dedicated record store that contains hash-based value resolution is analogous to a 2D hashmap. Once registered, entity 132 may then utilize its blockchain based account (i.e., its private key) to write data into its respective dedicated record store smart contract for public distribution.

FIG. 2 also depicts an example main data flow 200 of key issuing entity 130, wherein entity 132 (first party 110 and/or second parties 120-122) desires to modify 215 blockchain 118 (entity 132 making an edit to its respective place on the blockchain). Entity 132 is only able to edit 215 its corresponding record or space on blockchain 118 using his private key 220. In general, a record or space on the blockchain may only be modified by the advertising industry entity who owns it (i.e., the party who has the corresponding private key), and all modifications to the record store are cryptographically signed. Thus, it is provable that only the advertising industry entity who owns the record store has modified the records in the record store.

The record store allows for real-time revocation and re-issuance of cryptographic identities by the owner of those identities. This is accomplished through the distributed state machine of the blockchain 118. In the event that a record exists in the current state of the blockchain data store, and that record is not expired, the record should be taken as valid. In the event that a record is not present, at the expected location in the blockchain data-store, this should be taken as an invalid reference. Such an invalid reference may indicate a forgery or a revocation, depending on the circumstance. In the event that a record is expired, the return data for a request for this record should return the same data as a missing record.

Referring now to FIG. 2A, a block diagram illustrating the main process flow 250 detailing the functionality of key issuing entity 130 is depicted. At step 260, entity 132 transmits request 205 to entity 130. It is to be understood that request 205 for verification being transmitted to key issuing entity 130 is a request distinct from the ad request referred to throughout the disclosure, wherein request 205 is an entity specific request for a key or a request to edit a previously issued key by at least one of first party 110 or second parties 120-122, and key issuance must occur in order for entity 132 to be verified to participate in the transmission steps presented in FIG. 3. At step 270, a decision is provided via server 150 as to whether entity 132 is validated to participate in the process occurs, in which if entity 132 is not verified based on credentials then key issuing entity 130 does not issue key 220 and entity 132 is notified that it is not verified. Otherwise, entity 132 is verified via server 150 and step 290 occurs in which entity 132 is issued entity-specific key 220 and enabled to perform edit 215 to blockchain 118 and key issuing entity 130 writes the public key to blockchain 118 subsequent to validation.

In this way, the record store is designed to allow for secure self-management of cryptographic identity and verifiable information in a public repository. In at least one embodiment, the record store is designed to allow all information to be stored under a time to live (TTL). The inclusion of a TTL allows for the programmatic expiration of records. In one embodiment, the record store will also enforce TTL on records such that a seller/publisher may issue a buyer/advertiser a right to sell for some interval of time, where the record will be treated as invalid after the date of expiration.

Figure 3:
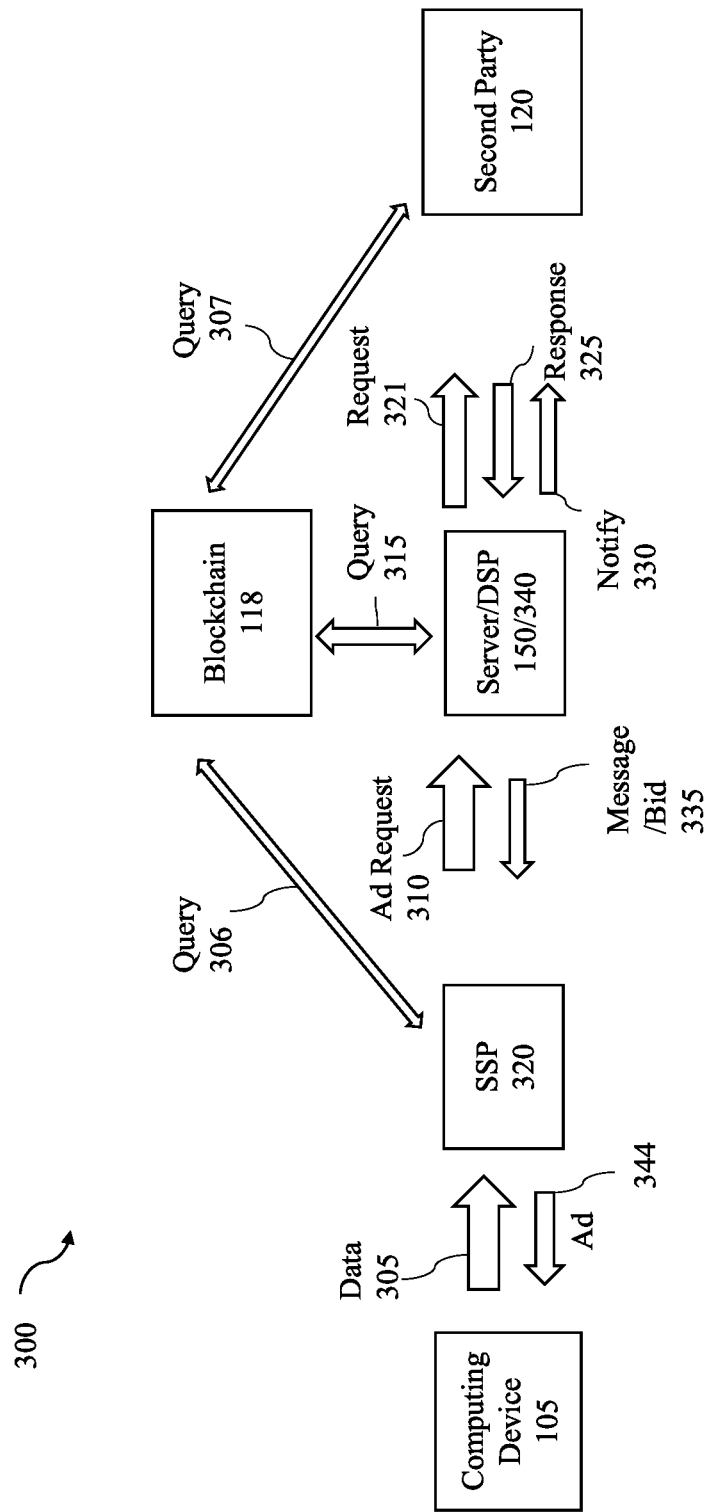
FIG. 3 is a flowchart illustrating an example querying process within the system for providing authenticity, integrity, and non-repudiation to advertising technology, according to an example embodiment.
Figure 4:
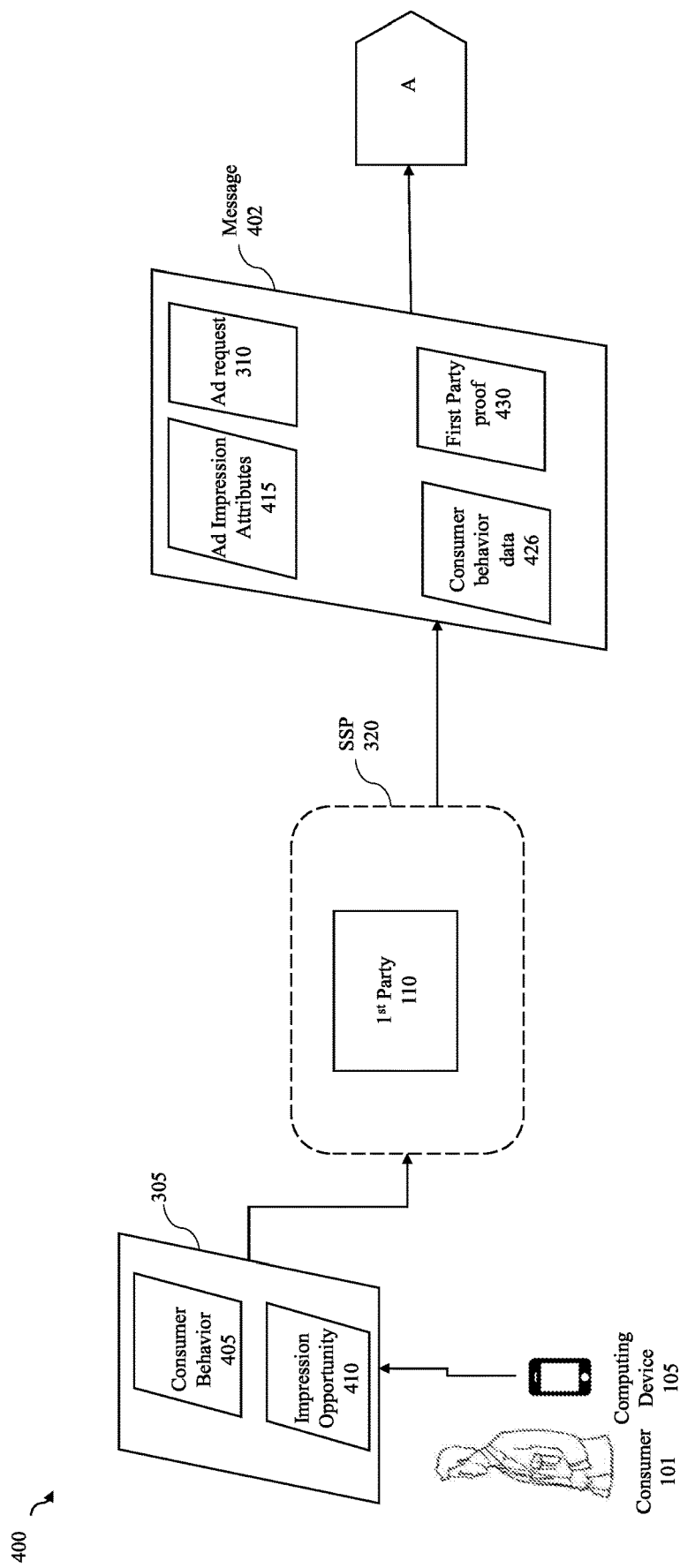
FIG. 4 is a block diagram illustrating a first example data transmission within the system for providing authenticity, integrity, and non-repudiation to advertising technology, according to an example embodiment.
Figure 4A:
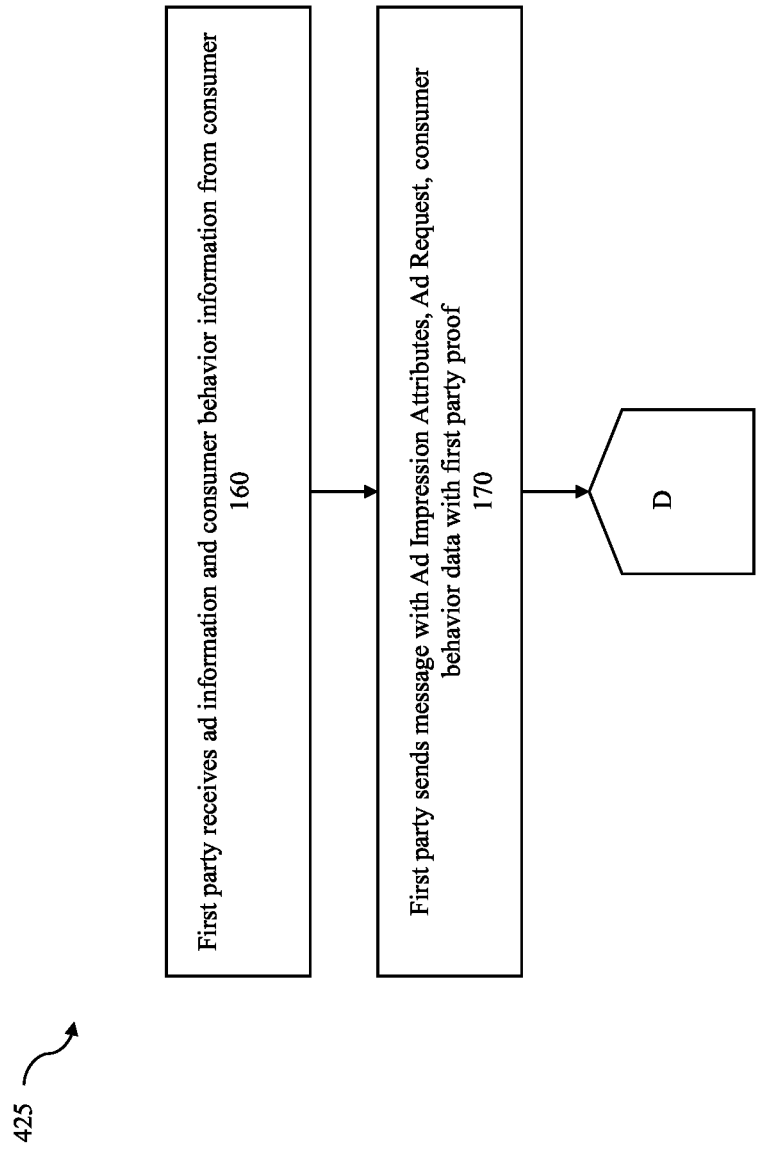
FIG. 4A is a flowchart illustrating the first example data transmission within the system for providing authenticity, integrity, and non-repudiation to advertising technology, according to an example embodiment.

Referring now to FIGS. 3 & 4A, an overall data flow 300 illustrating the steps performed to ensure authenticity of data transmitted within system 100 is depicted according to example embodiments. In one embodiment, prior to occurrence of key issuing entity functionality 200, process 425 of FIG. 4A depicting an initial data transmission 305 (as illustrated in FIG. 3) exchanged between computing device 105 and the publisher and/or and SSP 320 occurs.

Referring to FIG. 3, the process begins when a consumer with his or her consumer device 105, accesses content provided by a publisher or first party. The content may be media content provided by publisher may take a wide variety of forms, including text, video, images, audio, games, data, software, or other multi-media content. Additionally, the media content may be presented to the consumer in a variety of different ways, such as providing the media content using a web browser application on the consumer computing device 105 (e.g., a webpage), providing the media content by streaming or otherwise directly retrieving the media content via a software application (e.g., a music or video streaming application, a news reader application, or a weather information application), or simply by executing a software application locally (e.g., a video game or other software having some compelling or useful function). The consumer 101 may use the computing device 105 so access, view, or otherwise interact with ad content provided by the publishers that are associated with the SSP 320. The ad content of the publishers may be provided to a consumer on a consumer device 105 in conjunction with an advertisement or only after the consumer views media content.

FIG. 4 is a block diagram illustrating a first example data transmission of data flow 400 within the system for providing authenticity, integrity, and non-repudiation to advertising technology, according to an example embodiment. FIG. 4A is a flowchart illustrating the first example data transmission 305 within the system for providing authenticity, integrity, and non-repudiation to advertising technology, according to an example embodiment. Process 425 begins with step 160 when the first party receives initial data transmission 305 from computing device 105. The data transmission may consumer behavior data 405 associated with the consumer and content data associated with the content being viewed or consumed on computing device. Consumer behavior data may include attributes associated with the consumer associated with computing device 105, such as age, gender, race, hobbies, geographic location, purchasing history, income, browser history, etc. However, it is understood that other data associated with the user using the computing device may be used and are within the spirit and scope of the present invention. Additionally, an impression opportunity 410 that may be be provided in transmission 305. An impression opportunity may be created at the time the media content is viewed or otherwise presented to the consumer, which may be simultaneous with retrieval of the media content from the first party computing device 105 or at a time subsequent an initial retrieval of the media content from the publisher device. When an impression opportunity presents itself, first party, SSP or first party via SSP, informed of the advertisement impression opportunity, either directly or indirectly through ad tags, ad pixels, or other logic from an advertising SDK that is built into the media content provided by the publisher. It will be appreciated by those of ordinary skill in the art that ad tags and/or ad pixels are generally short snippets of code (e.g., javascript) that, in the context of advertising, collect information about the consumer and/or the behavior of the consumer on the website, application, or other context surrounding the advertisement impression opportunity. The tags and/or pixels may also collect and/or report information about the impression opportunity, such as format information (e.g., audio advertisement, video advertisement, banner advertisement, etc.). However, it is understood that other data may be provided within the spirit and scope of the present invention.

Next, in step 170 the first party analyzes the plurality of information of transmission 305. At step 170, once first party 110 receives applicable data included within the plurality of information via initial data transmission 305, first party 110 scrutinizes the applicable data. The first party may then, either directly or via SSP 320 transmit a message 402 comprising at least an ad request 310 to server 150 and/or DSP 340 (depending upon the configuration wherein server 150 functions as both) as illustrated in FIG. 3.

In one embodiment, message 402 comprises a plurality of ad impression attributes 415, at least one ad request 310 (wherein the ad request is the number of ad units that requested ads), a set of consumer behavior data 426 wherein the set may comprise a subset of consumer behavior data 405, and a first party proof 430 configured to be used as a cryptographic component that provides non-repudiation and data integrity of the ad request 321. In one embodiment, ad impression attributes 415 may also include metrics counted each time an ad is loaded on a site and may comprise interaction attributes, outlier activity, sequential activities, suspicious activities, or any other applicable type of ad impression attributes relevant to RTB. Such data may include information about the consumer, such as a device type of the consumer, an IP address of the consumer, and an operating system of the consumer, information about the media content, and/or information about the publisher.

It should be noted that that the first party may also transit directly to the DSP or may use the SSP to transmit the information to the DSP. The SSP, DSP or both check all cryptography, including verifying the first party cryptographic proof against the corresponding blockchain-based record store. The cryptographically secured RTB process allows a method for cryptographically verifying parties and their interactions with each other resulting in no party having the ability to deny accountability for actions occurring within the ad sales process. It is to be understood that system 100 at a foundational level operates utilizing a consensus decision-making process in which first party 110, second parties 120-123, and/or key issuing entity 130 agree to support a decision in the best interest of system 100 based on criteria defined by key issuing entity 130 or in various configurations first party 110 and/or second parties 120-122. First party 110 is configured to provide impression opportunities wherein server 150 authorizes both the opportunities themselves and the terms under which the opportunities are to be extended, and second parties 120-122 are configured to provide the bids to DSP 340, or the DSP is configured to provide bids based on accessing a database of second parties seeking to purchase ads online, wherein server 150 stores attributes associated with each second party and where the server matches the ad request with a selected second party in the database based on the attributes associated with each second party in the database and the attributes associated with the ad impression of the ad request, and DSP 340 in combination with server 150 verify the content associated with the bid in addition to their authority to provide said bids.

The first party proof 430 is a cryptographic proof of the first party where the blockchain comprises a public key infrastructure that allows the third cryptographic proof of the first party to be authenticated against a public key associated with the first party by the receiving entity (SSP, DSP, second parties, other entities of the system). In one embodiment, first party cryptographic proof 430 provided directly, or via the SSP, to the DSP 340 in combination with server 150 is a cryptographic derivative of the aforementioned consensus which may comprise a merkle root, depth factor, and/or a key signature in order for proof 430 to function as an entity-specific and/or transaction-specific form of identification and verification within blockchain 118. In one embodiment, the cryptographic proof of the other first party (or other entities associated with the system) may be appended to one or more messages that are derived from the private key corresponding to the public key that is written in blockchain 118 for the first party.

The term cryptographic proof throughout this application, in one embodiment, may be any cryptographic structure, signature or means for cryptographically verifying data. In certain embodiments, to be compatible with existing protocols, these cryptographic proof and/or signed tokens (discussed below) can be appended to messages using an existing field of an existing protocol, such as ext fields present in the OpenRTB specification. In one embodiment, due to the need to compactly represent a cryptographic claim in both strongly typed structures, such as protobuf, and generic structures, such as JSON, the signatures are compactly encodable as UTF-8 strings. These proofs provide non-repudiation, integrity, and authenticity guarantees for those elements of a message that are signed. In particular, these signatures may be validated by a receiving entity by verifying that the signature is valid and ensuring that the claimed origin of the message does in fact have a corresponding record in the blockchain record store system that claims possession of the associated public key used to verify the signature. In one embodiment, rather than specify a new encoding mechanism for these signature objects, it is proposed that an existing standard can be utilized. The motivation for this is twofold. First, the usage of an existing protocol minimizes the amount of code that must be written to facilitate adoption. Second, the usage of an existing protocol minimizes the introduction of security flaws due to the public review that has already been conducted on the previously publicly adopted protocol. Specifically, in one embodiment, the signature objects are constructed from Javascript Object Signing and Encryption Documents (JOSE). These standards are written for the specific purpose of securing machine to machine and human to machine interactions in a compact, url safe manner. Further, these standards are written to facilitate asymmetric and symmetric cryptographic operations that include cryptographic signatures. Finally, these specifications are designed specifically to work with JSON objects, such that they lend themselves well to OpenRTB messages with minimal modification.

In at least one embodiment, the Ed25519 public-key signature system is used as a signing algorithm for JWS. Ed25519 signatures are elliptic-curve signatures designed to achieve very high speeds without compromising security. Usage of this algorithm is advantageous for two specific reasons. First, this algorithm is dramatically more performant than other asymmetric signing algorithms. Second, if the LibSodium implementation is utilized, the security of this protocol is far superior to other systems due to recent Zero-Day exploits discovered in microprocessor hardware. The security benefits are derived from the non-conditional execution path during signature generation in the Lib Sodium libraries. Additionally, Ed25519 signatures outperform systems using other signing such as Secp256r1 which is used in other applications. Secp256r1 signatures are a poor choice for the engineering requirements of the advertising industry. For example, on current consumer grade hardware, Secp256k1 has maximum performance of about 4,000 signatures per second and verifications are far worse with a value around 1,300 verifications per second. Comparatively, the Ed25519 curve, on modern consumer grade hardware, has the ability to sign over 100,000 times per second with an equivalent security to the Secp256r1 curve. Additionally, Ed25519 algorithms are capable of verifying over 70,000 signatures per second. Accordingly, it is evident that the operational expense of Secp256r1 will be at least 25 times more expensive than Ed25519. It will be appreciated that the ability of a single entity to fully anticipate all desired characteristics of a protocol is an unrealistic expectation. Due to this pragmatic viewpoint, the signature objects are described in such a manner that the industry may adopt conventions that best utilize the primitives described herein for a specific interaction. Accordingly, in at least one embodiment, the signature objects are designed such that they do not contain any information from the object being provided with integrity guarantees directly. Instead the signature objects contain a query path, or collection of query paths that describe a collection of objects, for example from an associated OpenRTB object. These query path objects may take several forms, based on existing industry standards, such as jmesPath, JSONPath and protobuf3. The general form of these query path descriptors is dot separated notation for key value lookup paths in a nested data structure.

In other embodiments, more advanced systems allow for glob style matching across subkeys, but this functionality should be used with caution due to the potentially inadvertent inclusion of unnecessary data. The operation of a signature construction and verification is as follows. First, a cryptographic proof is generated by encoding a collection of paths that describe a projection of an object, for example an OpenRTB object private key is used to sign the object into the signature object itself. This projection describes all data that has been signed. In the projection map, the values from the object are stored at the path that describes how to access the projected element. In one embodiment, once this projection map has been constructed, a further signature and serialization process, for example Javascript Object Signing and Encryption (JOSE), is utilized for robust signature generation. However, other means of providing a cryptographic proof may also be used and are within the spirit and scope of the present invention.

Returning to FIG. 3, after the server 150 authenticates the first party ad request by querying the block chain, DSP 340 may be utilized by second parties 120-122 in order to receive bid requests and to provide a response 325 based on a request 321 transmitted from server 150 as illustrated in FIG. 3. In other embodiments, the DSP may use attributes associated with the second parties stored in the attached database(s) 151 to response to the ad request 310. It is to be understood that each of the aforementioned data transactions may be hosted or assisted by server 150 supporting its configuration to function as a centralized platform.

Figure 5:
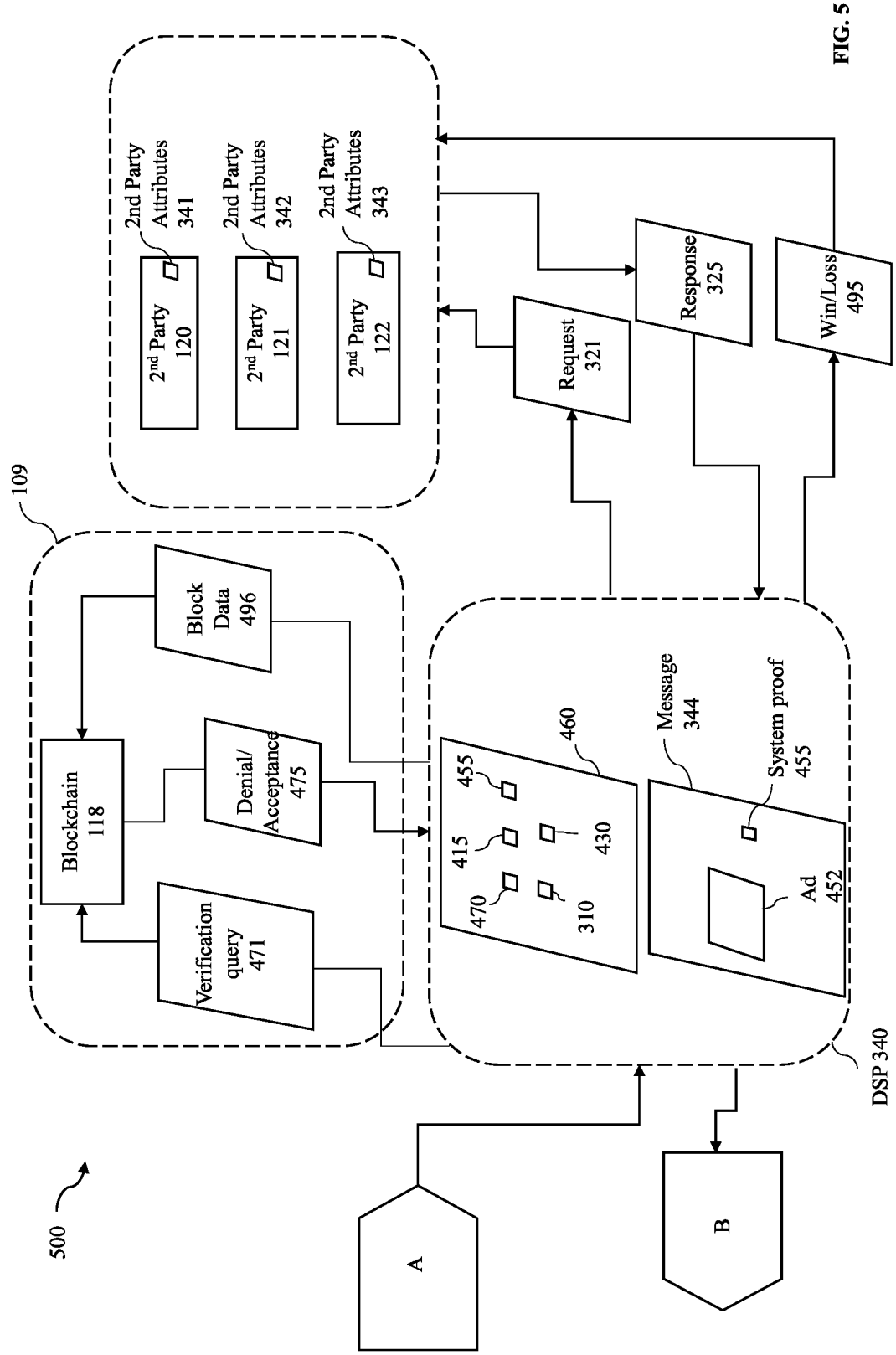
FIG. 5 is block diagram illustrating a second example data transmission within the system for providing authenticity, integrity, and non-repudiation to advertising technology, according to an example embodiment.

Referring to FIG. 5, server 150/DSP 340 receives ad request 310 for an ad space available for sale, where the ad request comprises ad impression attributes 415 and first party proof 430. Server 150 utilizes DSP 340 in order to set the terms and conditions associated with the auction based on ad request 310, and transmits requests 321 to second parties 120-122 expecting response 325 to comprise bids manifesting attributes inherent to each of second parties 120-122. As mentioned above, in other embodiments the server 150 and database 151 may store the attributes associated with each second party in order match the attributes associated with the ad impression of the ad request (after the first party has been authenticated as explained below). In other embodiments, after authenticating the first party (further explained below in step 522), the server 150 is configured to transmit a notification 330 to second parties 120-122 indicating whether the authenticity of second parties 120-122 and their respective content are validated based upon queries on blockchain 118 discussed in further detail below.

In one embodiment, once second parties 120-122 are registered with DSP 340, second parties 120-122 may utilize their respective private keys to edit the blockchain 118 with the intention of subsequent public distribution. It is to be understood that edits to blockchain 118 may only be performed based on the content and the source that the content is associated with. In other words, second parties 120-122 may only make modifications of their own content via utilization of their respective private keys, and all said modifications to blockchain 118 are cryptographically signed, rendering them identifiable and trackable.

Referring back to FIG. 3, it is to be understood that server 150 is further configured to consume the aforementioned bid request and sign or counter sign the bid request with a private key or cryptographic proof inherent to server 150 for verification purposes. Furthermore, entity 130 is configured to authenticate the non-repudiation and data integrity of request 205 via one or more queries, wherein the queries may be resolution queries performed on blockchain 118 configured to return an address. In one embodiment, each of first party 110, second parties 120-122, and server 150 may query blockchain 118 in order to obtain authentication of the other parties, specifically first party 110 and second parties 120-122. For example, first party 110 may perform a query 306 on blockchain 118 in order to receive authentication information associated with second parties 120-122, and second parties 120-122 may perform a query 307 on blockchain 118 in order to receive authentication information associated with first party 110. In one embodiment, server 150 performs a query 315 on blockchain 118 in order to determine whether first party 110 is authenticated along with the non-repudiation and data integrity of ad request 310. Additionally, in certain embodiments, the server 150 performs a query 315 on blockchain 118 in order to determine whether any SSP or any of the second parties 120-123, or other messages received by the DSP to determine the authenticity of the message received. one embodiment, server 150 functions as the centralized source for second parties 120-122 to provide data associated with each respective entity's campaign, targeting models, and other information relevant to agencies (advertisers) maximizing return of investment. Examples of contributions of second parties 120-122 comprise parameters such as, but not limited to, referring sites (which is where consumer 101 originated), computing device 105 events (scrolls, clicks, highlights, etc.), search queries, time of sessions, demographics, interaction history with ad content, and any other applicable parameters. Server 150 utilizes the verified bids, verified content, and their validated sources obtained through the aforementioned querying processes to transmit a message 344 to SSP 320, the message comprising the bid and its associated content based on the results of the auction.

Referring now to FIG. 5, a block diagram representing the data flow 500 auction and subsequent actions triggered based upon the result of the auction within system 100 is depicted. In one embodiment, once DSP 340 receives applicable data defining the terms and conditions of the auction, a request 321 is transmitted to second parties 120-122 in order to notify second parties 120-122 of said terms and conditions in which server 150 expects to receive bids. In one embodiment, second parties 120-122 provide a response 325 to request 321 in which second party 120 provides a first set of second party attributes 341, second party 121 provides a second set of second party attributes 342, and second party 122 provides second party attributes 343, wherein each party's attributes are configured to be stored in a database allocated to each respective second party. The second party messages, like other entities in the system, may include cryptographic proof of the second party where the blockchain comprises the public key infrastructure that allows the cryptographic proof of the second party to be authenticated against a public key associated with the second party (via query 315 as illustrated in FIG. 3).

However, it is understood that other additional second parties and other third-party entities may transmit responses. In one embodiment, once DSP 340 receives response 325, server 150 extracts and utilizes the aforementioned attributes of each respective second party in addition to ad impression attributes 415 associated with impression opportunity 410 along with the terms and conditions in order to select a winner. The combination of attributes are required in order for server 150 to perform a matching of ad request 310 to the second party specific parameters resulting in at least one of second parties 120-122 being selected by DSP 340 based on alignment of said parameters to the ad impression attributes 415 and the aforementioned factors.

In one embodiment, the matching is based on attributes associated with a second party, the ad impression of the ad request, and the consumer behavior data associated with the ad impression of the ad request. Once the winner is decided, server 150 provides a win/loss notification 495 to second parties 120-122 notifying them of their status. In one embodiment, wining attributes 470 of the auction may comprise ad impression attributes 415, ad request 310, consumer behavior data 426, and first party proof 430, data related to the winning second party, data related to the winning bid selected by the DSP. It is to be understood that verification step may be accomplished at any time during the auction via the verification query 471 and response 475 in which server 150 queries blockchain 118 based to validate the party based on the authenticity and integrity of the party and or data.

In certain embodiments data associated with certain transactions may be recorded on the block chain. The processor 150 may be configured for recording of a cryptographic proof of the message 344 having an ad for the selected second party to in the blockchain. Data written on the block chain associated with message 344 may include a plurality of data 496 configured to be recorded to the blockchain. Data 496 may include all of the data associated with the winning bid. Data 496 may be used to include all or part of the subset 460. Data 460 may include all of the data associated with a winning bid, including winning attributes 470, ad request 310, first party proof 430, ad impression attributes 415 and system proof 455. However, it is understood that other data may be included with subset 460. In one embodiment, block data 496 may be a subset of data 460 for blockchain 118 configured to be transmitted to blockchain 118 in a manner that reduces the overall amount of storage space required to store winning attributes 470 of the action in blockchain 118, or data for blockchain 118 can be written directly to blockchain 118 subject to storage limitations. Optionally, the system and server may be configured to intermittently record, or record, to the blockchain a cryptographic accumulator of all messages signed by each party such that an independent party may either independently generate or request from the participant a proof of inclusion of a message that has been signed in some interval by the participant against the cryptographic accumulator.

Assuming verification of winning attributes 470 has been identified, DSP transmits an ad message 344 having a system proof 455 validated by server 150 and a winning second party ad 452 to SSP 320, to the first party or the first party via the SSP. In one embodiment the winning attributes may include data related to the second party that won, auction details (price paid), In one embodiment, the cryptographic proof of message 344 may include a signature of DSP, and the PKI of blockchain 118 enables the signature of the DSP to be verified. The signature of the system may be identifiable with the system and further for providing non-repudiation and data integrity of the data associated with response to the first party directly or via the SSP. It is also understood that the signature of the system may include a layered cryptographic proof.

Alternatively or additionally, after DSP 340 selects the winning second party, server 150 transmits a verification query 471 in order to authenticate the winning party and associated attributes of the winning party, and based upon this authentication a plurality of winning attributes 470 are transmitted to blockchain 118 based on a set of data for blockchain 460 if the winning second party has been authenticated.

Referring now to FIG. 5A, process flow 525 of the auction of FIG. 5 is depicted, according to an example embodiment. At step 514, server 150 receives message 402 comprising ad impression attributes 415, ad request 310, consumer behavior data 426, and first party proof 430 from the first party via SSP 320 or from the first party directly as illustrated in FIG. 4. At step 516, server 150 performs query 315 on blockchain 118 as illustrated in FIG. 3 in order to authenticate first party 110 based on at least first party cryptographic proof 430 wherein first party proof 430 is cryptographic proof of providing non-repudiation and data integrity of the message provided by the first party (directly or via SSP) and wherein blockchain 118 comprises a public key infrastructure (PKI) that enables the public key of first party 110 to be verified as being associated with first party 110.

At step 522, a determination as to whether first party 110 is authenticated is made based on at least first party proof 430, wherein if proof 430 is not authenticated then step 524 occurs in which first party 110 is notified of the lack of authentication, thereby ending the process. Otherwise, step 527 occurs and, in one embodiment, server 150 transmits request 321 for bids to second parties 120-122. In one embodiment, server 150 broadcasts to second parties 120-122, or other advertising entities of the system a message comprising a cryptographic proof that comprises consumer behavior data 426. The message is such that the cryptographic proof broadcast by the servicer allows only a subset of second parties 120-122 to open and view the consumer behavior data. In such cases only the second parties having the appropriate key may view or have access to the appropriate subset of data. In one embodiment, server 150 send to second parties 120-122 a message (321), where that message has a proof that only second party 120 is allowed to access a certain sub-set of data associated with the message, such as consumer behavior data. In operation, the sever may be configured to grant access to this subset of data to a certain sub-set of second parties as a type of premium package.

In one embodiment, in addition to or alternatively to broadcasting to second parties or sending a request for a response, in step 528 the DSP transmits to second parties a message 321 to the second parties to provide a bid response 325 to the DSP. In such cases, in step 529, server 150 receives response 325 from second parties 120-122. In one embodiment, internal database 151 is the source for second party attributes 341-343 wherein system 100 is continuously collecting and storing advertising attributes from sources both associated with and not associated with system 100, or second party attributes 341-343 may be sourced from an external database outside of system 100, such as directly from second parties 120-122 or any other applicable advertising source. Attributes associated with the second parties may be attributes associated with advertisers typically associated with on-line advertisers such as second party identifying information, target consumer characteristics, browsing history, viewing history, search history, geographic location, IP address, media content consumed by the consumer etc. However, it is understood that other data associated with the marketer or second party attributes may be used and are within the spirit and scope of the present invention.

At step 529, DSP 340 receives response 325 from second parties 120-122. At step 531, DSP 340 selects the winning second party out of second parties 120-122. It is to be understood that the selection of a winning bid occurs based upon the bid responses that server 150 receives; however, receiving this data may be based upon the configuration of the source the bid is being provided from. At step 532, server 150 transmits winning second party message 344 comprising at least an ad of the winning second party 452 configured to be presented on computing device 105 and a cryptographic data system proof 455. At step 534, server 150 notifies second parties 120-122 of their win or loss status respectively; however, this step may performed prior to or simultaneously with step 532.

Figure 6:
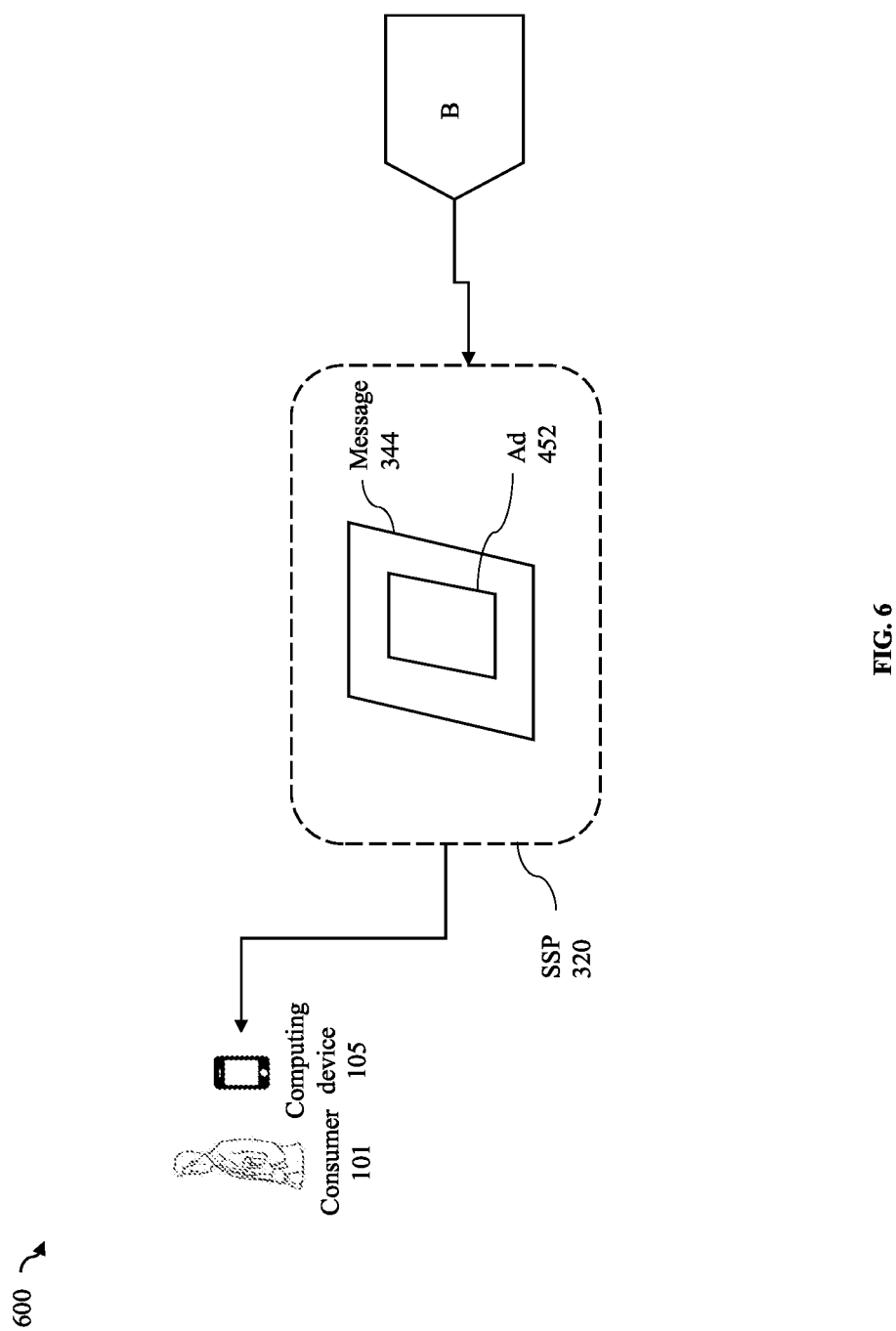
FIG. 6 is block diagram illustrating a third example data transmission within the system for providing authenticity, integrity, and non-repudiation to advertising technology, according to an example embodiment.

Referring now to FIGS. 6-6A, a block diagram representing the data flow 600 or transmission and presentation of ad content to consumer 101 and a supporting data flow 610 are depicted respectively. At step 620, first party 110 receives from DSP directly, or via SSP, message 344 comprising ad 452 of the winning second party associated with the winning second party and cryptographic proof so as to fill the ad impression with the ad for the selected second party. The cryptographic proof 455 may comprise layered signatures or proofs of the entities that have interacted with the ad that is to be provided to consumer comping device 105. In one embodiment, server 150 is configured to layer signatures and/or proofs associated with each respective party of an ad transaction wherein each of first party 110, second parties 120-122, and potentially server 150 comprises a party-specific proof configured to function as a layer in a plurality of layers in order to support verification of information associated with an authorized cryptographic identity respective to each party. In one embodiment cryptographic proof 455 may include the signature of the DSP/server 150, wherein the blockchain's a public key infrastructure allows the cryptographic proof 455 of the system to be authenticated against the DSP's public key, that allows the receiving party (publisher directly or via the SSP) to authenticate the message 344.

In other embodiments, cryptographic proof 455 may include a layered signature having components of the first party, SSP, DSP, second parties or any combination thereof.

In one embodiment, system 100 supports use of JWT token containing a description of a projection (subset) of the parent object and the hash of the parent object enables arbitrarily extensible cryptographic protections with no prior negotiation of terms. Additionally, the use of URL encodable objects (the JWT tokens) provides a cryptographically verifiable means of linking an event callback (e.g., DSP notification URLS from a VAST document) to a winning bid. Moreover, by encoding only the information that describes how to access all elements that have been signed in a deterministic manner, any subset of information may be signed in such a way that any other entity may validate the signature trivially. At step 630, first party 110 sends the ad 452 of the winning second party to computing device 105. It is to be understood that the ad 452 of the winning second party is designed and configured for viewing and potential interaction with consumer 101 via computing device 105.

The ad may include content associated advertisements including audio and visual content, metatag data, links, any other data that is typically associated with media to be provided to computing devices 105 of consumers.

At this point, the first party computing device 110 directly or via the supply-side platform 320 constructs a billing notification message and transmits the billing notification message to the demand-side platform 340. The billing notification message includes information for the purpose of billing and payment by the advertiser for the placement of the advertisement with respect to the particular advertisement impression opportunity. This message may also be provided having a cryptographic proof associated with the first party so that bill may have non-repudiation and data integrity.

Figure 7:
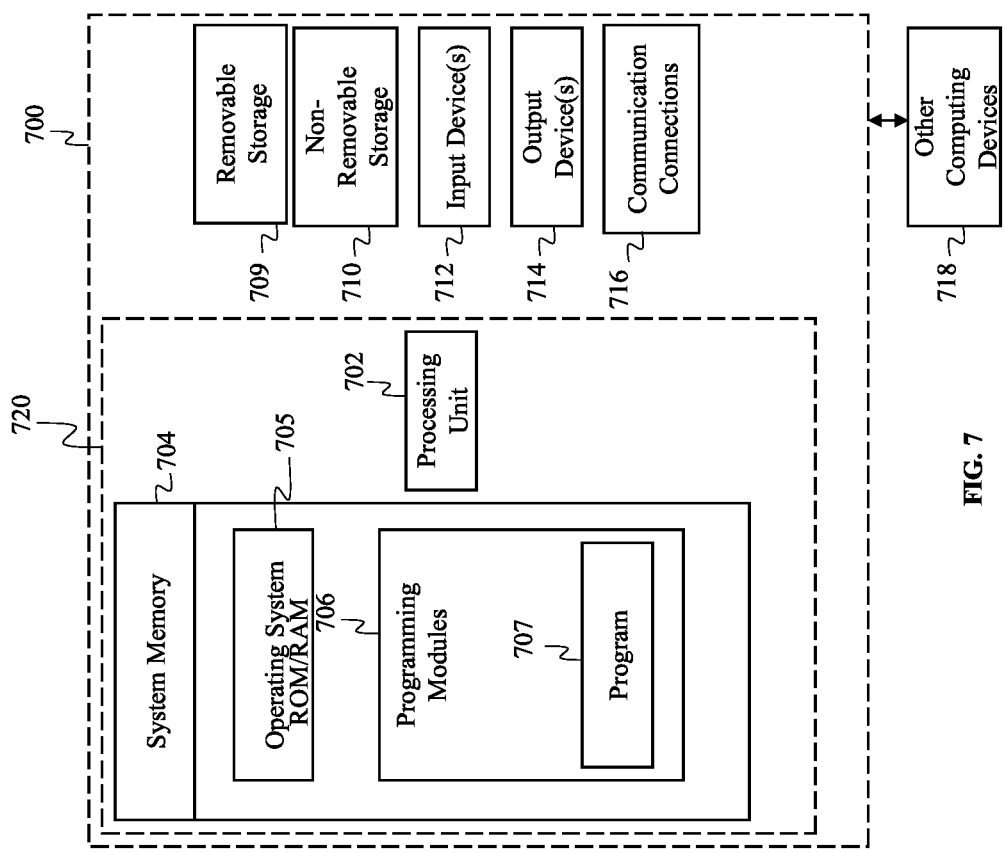
FIG. 7 illustrates a computer system according to exemplary embodiments of the present technology.

FIG. 7 is a block diagram of a system including an example computing device 700 and other computing devices. Consistent with the embodiments described herein, the aforementioned actions performed by system 100 may be implemented in a computing device, such as the computing device 700 of FIG. 7. Any suitable combination of hardware, software, or firmware may be used to implement the computing device 700. The aforementioned system, device, and processors are examples and other systems, devices, and processors may comprise the aforementioned computing device. Furthermore, computing device 700 may comprise an operating environment for system 100. Processes, data related to system 100 may operate in other environments and are not limited to computing device 700.

A system consistent with an embodiment of the invention may include a plurality of computing devices, such as computing device 700. In a basic configuration, computing device 700 may include at least one processing unit 702 and a system memory 704. Depending on the configuration and type of computing device, system memory 704 may comprise, but is not limited to, volatile (e.g. random access memory (RAM)), non-volatile (e.g. read-only memory (ROM)), flash memory, or any combination or memory. System memory 704 may include operating system 705, and one or more programming modules 706. Operating system 705, for example, may be suitable for controlling computing device 700's operation. In one embodiment, programming modules 706 may include, for example, a program module 707 for executing the actions of system 100 for example. Furthermore, embodiments of the invention may be practiced in conjunction with a graphics library, other operating systems, or any other application program and is not limited to any particular application or system. This basic configuration is illustrated in FIG. 7 by those components within a dashed line 720.

Computing device 700 may have additional features or functionality. For example, computing device 700 may also include additional data storage devices (removable and/or non-removable) such as, for example, magnetic disks, optical disks, or tape. Such additional storage is illustrated in FIG. 7 by a removable storage 709 and a non-removable storage 710. Computer storage media may include volatile and nonvolatile, removable and non-removable media implemented in any method or technology for storage of information, such as computer readable instructions, data structures, program modules, or other data. System memory 704, removable storage 709, and non-removable storage 710 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 700. Any such computer storage media may be part of system 700. Computing device 700 may also have input device(s) 712 such as a keyboard, a mouse, a pen, a sound input device, a camera, a touch input device, etc. Output device(s) 714 such as a display, speakers, a printer, etc. may also be included. The aforementioned devices are only examples, and other devices may be added or substituted.

Computing device 700 may also contain a communication connection 716 that may allow system 100 to communicate with other computing devices 718, such as over a network in a distributed computing environment, for example, an intranet or the Internet. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 704, including operating system 705. While executing on processing unit 702, programming modules 706 (e.g. program module 707) may perform processes including, for example, one or more of the stages of a process. The aforementioned processes are examples, and processing unit 702 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A system for providing non-repudiation and data integrity of communications online, the system comprising one or more servers communicably connected to a communications network, the one or more servers including at least one processor configured for:
   receiving, from a first party, an ad request for an ad impression available for sale, wherein the ad request includes a plurality of attributes associated with the ad impression, consumer behavior data associated with the ad impression, and a first cryptographic proof that provides non-repudiation and data integrity of the ad request, wherein the first cryptographic proof comprises a second cryptographic proof of the first party; and,
   authenticating non-repudiation and data integrity of the ad request by querying a blockchain, wherein the blockchain comprises a public key infrastructure;
     wherein the public key infrastructure comprises a public key associated with the first party;
     and wherein the public key infrastructure authenticates the second cryptographic proof against the public key associated with the first party.

2. The system of claim 1, wherein the at least one processor is further configured for broadcasting to a plurality of second parties a message including a third cryptographic proof that includes consumer behavior data, wherein the third cryptographic proof allows only a subset of the plurality of second parties to open and view the consumer behavior data.

3. The system of claim 2,
   wherein the public key infrastructure comprises a second public key associated with each of the plurality of second parties;
   and wherein the public key infrastructure authenticates the third cryptographic proof against the public key associated with each second party.

4. A system for providing non-repudiation and data integrity of communications in ad sales online, the system comprising one or more servers communicably connected to a communications network, the one or more servers including at least one processor configured for:
   providing a blockchain comprising a public key infrastructure including public keys of parties, against which a plurality of cryptographic proofs of said parties may be authenticated;
   wherein the public keys of parties comprise a public key associated with the first party;
   receiving, from a first party, an ad request for an ad impression available for sale, wherein the ad request includes a plurality of attributes associated with the ad impression, consumer behavior data associated with the ad impression and a first cryptographic proof that provides non-repudiation and data integrity of the ad request; and,
   authenticating non-repudiation and data integrity of the ad request by querying the blockchain, wherein the authenticating comprises authenticating the first cryptographic proof against the public key associated with the first party;
   wherein the first cryptographic proof comprises a third cryptographic proof of the first party; and
   wherein the public key infrastructure authenticates the a second cryptographic proof against the public key associated with the first party.

5. The system of claim 4, wherein the at least one processor is further configured for broadcasting to a plurality of second parties a message including a third cryptographic proof that includes the consumer behavior data, wherein the third cryptographic proof allows only a subset of the plurality of second parties to open and view the consumer behavior data.

6. The system of claim 5,
   wherein the public key infrastructure comprises a second public key associated with each of the plurality of second parties; and
   wherein the public key infrastructure authenticates the third cryptographic proof against the public key associated with each second party.

7. A method for providing non-repudiation and data integrity of communications online, the method being executed on one or more servers communicably connected to a communications network, wherein the one or more servers including at least one processor, wherein the method comprises:
   receiving, from a first party, an ad request for an ad impression available for sale, wherein the ad request includes a plurality of attributes associated with the ad impression, consumer behavior data associated with the ad impression and a first cryptographic proof that provides non-repudiation and data integrity of the ad request, wherein the first cryptographic proof comprises a second cryptographic proof of the first party;
   authenticating non-repudiation and data integrity of the ad request by querying a blockchain, wherein the blockchain comprises a public key infrastructure;
   wherein the public key infrastructure comprises a public key associated with the first party; and,
   wherein the public key infrastructure authenticates the second cryptographic proof against the public key associated with the first party.

8. The method of claim 7, wherein the at least one processor is further configured for broadcasting to a plurality of second parties a message including a third cryptographic proof that includes consumer behavior data, wherein the third cryptographic proof allows only a subset of the plurality of second parties to open and view the consumer behavior data.

9. The method of claim 8,
wherein the public key infrastructure comprises a second public key associated with each of the plurality of second parties; and
wherein the public key infrastructure authenticates the third cryptographic proof against the public key associated with each second party.

* * * * *